Feb. 9, 1960  K. A. COOL ET AL  2,924,097
FLUID METER
Filed Oct. 12, 1955  5 Sheets-Sheet 1

INVENTORS.
KENNETH A. COOL
ERIC HOERNER
SAMUEL K. TAYLOR
BY Oberlin & Limbach
ATTORNEYS

INVENTORS.
KENNETH A. COOL
BY ERIC HOERNER
SAMUEL K. TAYLOR

*Oberlin & Limbach*
ATTORNEYS

Feb. 9, 1960 K. A. COOL ET AL 2,924,097
FLUID METER
Filed Oct. 12, 1955 5 Sheets-Sheet 3

INVENTORS
KENNETH A. COOL
ERIC HOERNER
SAMUEL K. TAYLOR
BY
Oberlin & Limbach
ATTORNEYS

INVENTORS.
KENNETH A. COOL
ERIC HOERNER
BY SAMUEL K. TAYLOR

Oberlin & Limbach
ATTORNEYS

Feb. 9, 1960   K. A. COOL ET AL   2,924,097
FLUID METER

Filed Oct. 12, 1955   5 Sheets-Sheet 5

INVENTORS.
KENNETH A. COOL
ERIC HOERNER
BY SAMUEL K. TAYLOR

Oberlin & Limbach
ATTORNEYS

United States Patent Office 2,924,097
Patented Feb. 9, 1960

2,924,097
FLUID METER

Kenneth A. Cool, Shaker Heights, Eric Hoerner, Dayton, and Samuel K. Taylor, Cleveland Heights, Ohio; said Cool and said Taylor assignors to The Service Recorder Company, Cleveland, Ohio, a corporation of Ohio Application October 12, 1955, Serial No. 539,976

5 Claims. (Cl. 73—251)

This invention relates to a device for measuring fluid flow, for example, in the fuel system of an automotive vehicle and, more particularly, to improvements in a meter of the type disclosed in application Serial No. 354,084, filed by Eric Hoerner on May 11, 1953, now Patent No. 2,860,512.

The meter described in such prior application is similarly intended principally for use in trucks, fleet cars and the like, to provide the owners or operators of the same with an accurate record of actual fuel consumption, the meter usually being inserted in the fuel supply line at the pressure side of the fuel pump. Very briefly, it comprises a single piston, a cylinder assembly, and valve means for automatically alternating the flow of the liquid fuel to the respective sides of the piston, thereby to reciprocate the same. Counter mechanism is actuated by such reciprocation of the piston and the unit is calibrated to provide the desired record of consumption in terms of gallons, or fractions of a gallon, of the fuel which has passed through the meter.

It is obviously very important that when the piston reaches an end of its stroke, the valve should be substantially instantaneously operated to shift to reverse the line connections and thereby to ensure a continuous flow of fuel through the device to the engine. To this end, the prior meter employs quick-acting spring mechanism for such shifting of the control valve. The spring mechanism is loaded by the movement of the piston under the pressure of the liquid supplied to the meter, and the thus stored energy is released to the valve instantaneously at the limits defining the stroke of the piston.

The present improvements are concerned principally with the manner of actuating the valve and the structure whereby this is accomplished; a primary object is to improve the mechanism previously employed for this purpose with a view toward simplification and to enhanced efficiency and reliability of the valving action.

It is another object of this invention to provide an improved arrangement of the springs used for actuation of the valve, differing with respect to the class of spring action employed and also to the manner in which this is applied to such purpose.

Another object is to provide novel mechanism for operating the counter of the meter, such change again affording a simpler, yet positive, mode of actuation.

It is also an object to provide a by-pass for the meter whereby air and vapor entrained in the liquid fuel as supplied to the meter is precluded from entry into the piston chamber of the same, such air and vapor being separated from the liquid and caused to flow around the meter.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
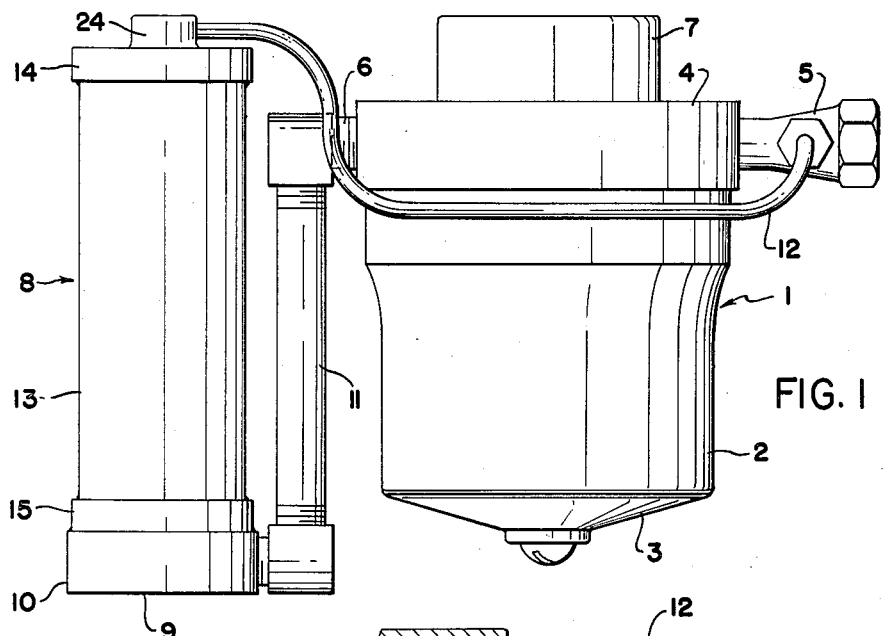
Fig. 1 is an elevational view of a complete fluid meter assembly in accordance with the present invention.

Referring now to the drawings in detail and especially to Fig. 1, the meter proper is designated generally by reference numeral 1 and comprises a cylindrical body 2 closed at its lower end by an integral and slightly outwardly dished wall 3 and at its upper end by a head or cover 4. The cover is provided with an outlet 5 and an immediate inlet 6, while secured to the top thereof is an enclosed mechanical counter assembly 7 of conventional construction.

As indicated previously, the meter is intended principally for use in automotive fuel systems and when thus used, or used to measure the flow of any liquid, an air and vapor separator 8 is incorporated at the inlet side of the meter. The inlet to the combined assembly is through a port block 9 at the bottom of the separator, the liquid being supplied at the end 10 of such member and flowing from the separator through the tube 11 to the inlet 6 of the meter proper. A small conduit 12 extends from the top of the separator to the outlet 5 of the meter, thereby to form the desired by-pass for air and vapor in the liquid fuel supplied under pressure to the meter assembly.

Figure 2:
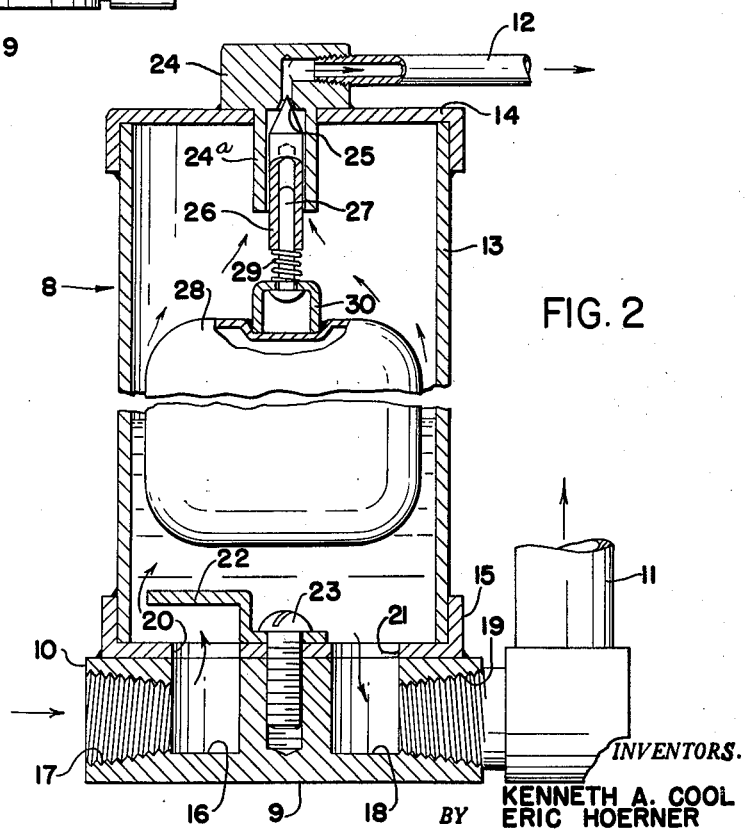
Fig. 2 is a vertical sectional view of a separator incorporated in the air and vapor by-pass of the meter proper.

The construction of the separator is shown in detail in Fig. 2 and comprises a cylinder 13 having a top plate 14 and a bottom plate 15, the latter of which is joined to the port block 9. Such block has a first port 16 communicating with a threaded opening 17 at the inlet side of the same and a second spaced port 18 to which the tube leading to the meter is connected in the threaded opening 19, the bottom plate of the separator body having holes 20 and 21 formed therein respectively aligned with such ports. The liquid fuel will accordingly flow in the direction indicated by the arrows into the cylinder 13 and from the same to the meter. A baffle 22 is arranged above the inlet port to assist in breaking up the incoming liquid flow, the baffle being attached to the bottom plate by the screw 23 which also connects the cylinder assembly to the port block.

The air and vapor separated from the liquid in the turbulent flow produced within the cylinder rise to the top of the same where they may escape through a valve head 24 to which the by-pass conduit 12 is connected. Such head includes an inner projection 24a having a passageway terminating in a needle valve seat 25 which serves as the escape orifice and is adapted to be closed by a plunger 26. The latter is of circular section while the passageway within which it is received is square, with rounded corners, whereby clearance is provided for the passage of vapor and gases between the two. The plunger is press-fitted on the upper end of a headed pin 27 which is joined at its lower end to a float 28, a spring 29 being disposed between the plunger and an inverted cup 30 secured to the float. The head of the pin is received within the cup and the fit of the pin proper with the cup is fairly loose, as illustrated, thereby to permit some wobble of the pin to avoid jamming even if the float shifts laterally. The spring, of course, provides vertical play for the pin. It will be clear that the float operates to close the by-pass by engagement with the pin head and lifting of the pin in the event that the liquid level becomes too high in the cylinder and thus ensures against any flow of the liquid through the by-pass line.

Considering now the meter proper, the same comprises an outer casing 2 which, as previously set forth, is of cylindrical cup-shape. Within this casing, there is disposed a sleeve or cylinder 31 having a fairly close fit with the outer casing. The top of the sleeve lies in the same plane as the top of the outer casing, while the bottom of the sleeve rests upon small protuberances 32 of the bottom wall 3 of the casing, so that the lower end of the sleeve is spaced slightly above the latter. A gasket 33 overlies commonly the upper ends of the casing and sleeve and fits within a groove formed in the head 4 of the meter, which is secured by screws 34 to the upper end of the casing.

Figure 9:
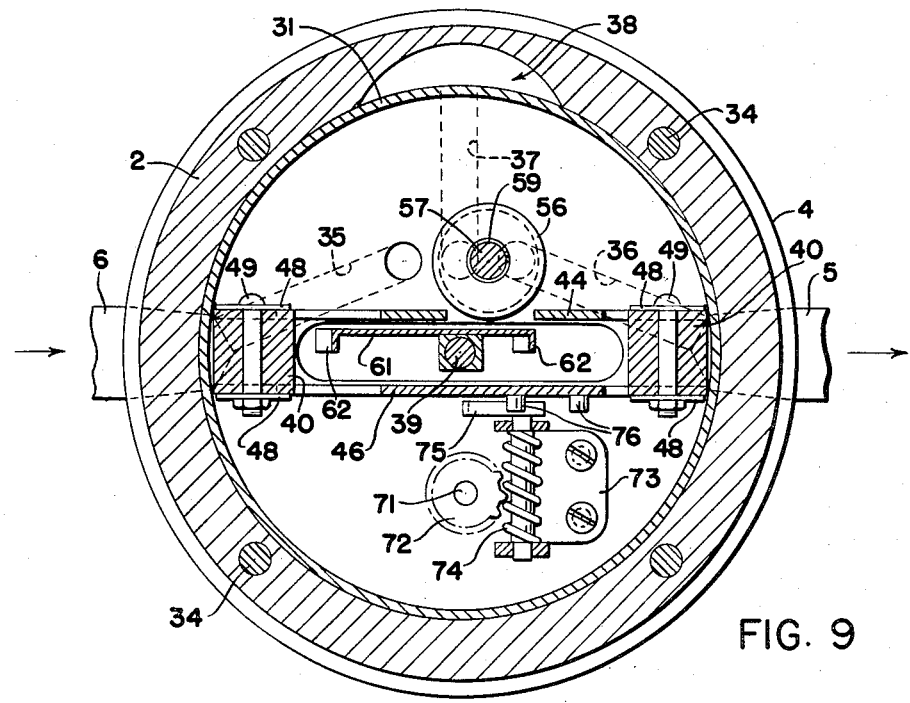
Fig. 9 is a transverse sectional view taken on the plane of the line 9—9 in Fig. 3.
Figure 10:
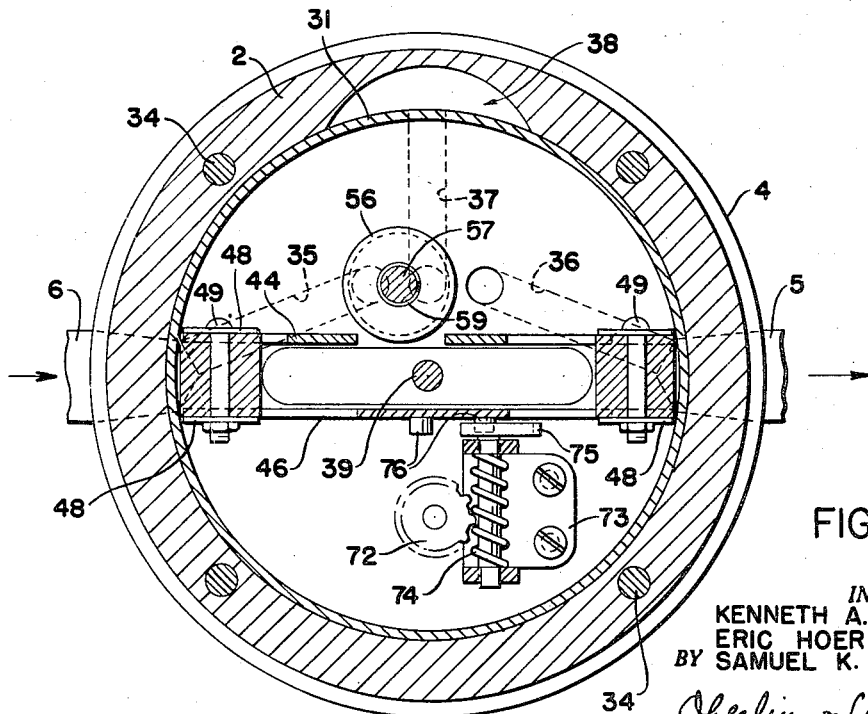
Fig. 10 is a like sectional view of the assembly in the Fig. 5 condition, as indicated by the line 10—10 in the latter.

As shown most clearly in Figs. 9 and 10, the head is provided with a first port 35 extending from the inlet 6 inwardly to one side and then downwardly to open into the interior of the meter body and a second port 36 extending between the outlet 5 and a point in spaced alignment with the inner end of the port 35, at which point it, too, is directed downwardly and opens at the underside of the cover. A third port 37 is provided which has a vertical portion between the two vertical sections of the ports 35 and 36 and a connecting horizontal portion extending outwardly to the side of the head beyond the inner cylinder 31. Both the head 4 and the outer casing 2 are cut-away in the region of the port 37 to provide a communicating recess extending from the same downwardly between the cylinder 31 and casing 2 to the bottom of the latter, such recess being indicated at 38.

Thus, the three head ports, in spaced-apart alignment, may be variably interconnected to control the flow of the liquid through the meter. The port 35 leads from the inlet to the top region of the casing or cylinder, port 37 leads from such region to the bottom of the cylinder 31, and the port 36 serves as an exhaust port connected to the meter outlet. By valve mechanism to be described, the liquid supplied to the meter is caused to flow alternately to the upper and lower cylinder regions and ultimately to be exhausted through the outlet.

The head 4 also carries a center guide post 39, projecting into the cylinder 31 and two depending posts 40, respectively at the inlet and outlet sides, in diametrical opposition. Each such post is formed with upper and lower flanges 41 and 42 and a central boss 43 at each of its sides, together defining horizontal slots which function as guides. At one side, the two posts support a valve plate 44 having spaced-apart arms 45 in the plane of the plate body and at the respective ends of the same. These arms are slidably received within the slots formed in the posts 40 at such side thereof, and the plate is of such length as to be reciprocable horizontally within the cylinder 31. At the other side, the posts mount a loader plate or slide 46 having planar end arms 47 received in a similar fashion in the post slots at this side, the loader plate also being horizontally reciprocable. Washers 48 are provided at the sides of the support posts to overlie the arms of the loader and valve plates, the washers being held in place by bolts 49 and functioning to maintain the plates positively within their particular slots of the posts.

The loader plate 46 is formed with two spaced arms 50 which project substantially at right angles from the body of such plate in the direction of and beyond the body of the valve plate 44. Attached to the portion of the latter between these arms is a trip element 51 projecting to both sides of the valve plate in parallel relation to the arms 50 of the loader plate. A shaft 52 is supported by the arms 50 of the loader plate and passes through the trip element 51, the shaft being capable of limited axial movement. A first compression spring 53 is provided about the shaft between the trip element and one arm of the loader plate, while a second compression spring 54 extends from the trip element to the other arm of the loader plate.

At the same side, the valve plate has a further right angle tab or ear 55 disposed below the region of the three ports 35, 36 and 37 in the head. Mounted on such ear is a cup valve 56 having a bottom stem 57 loosely received within an opening provided therefor in such ear. A relatively light coil spring 59 is disposed between the washer and the valve cup about the stem and holds the valve against the underside of the cover. As illustrated, the valve diameter is such that its hollow or recess may bridge either the inlet and middle ports or alternatively the middle and outlet ports, depending upon the particular valve position.

Loader plate 46 is provided with spaced pins 60 providing projecting cam surfaces adjacent the lower edge of such plate and between these is an angle plate 61 having parallel side flanges 62 and a hollow central boss 63 which fits on the center guide post 39 secured to the cover. By virtue of the inclination of the cam surfaces formed by the side flanges, and their engagement with the pins 60, the loader plate is cammed first to one side and then to the other as the angle plate moves up and down on the guide post. A piston 64 comprising spaced retainer plates 65 and interposed leather discs 66, having oppositely extending peripheral flanges, is secured to the boss of the angle plate by means of a collar 67 and screw 68, the boss end being stepped as indicated at 69 so that the several parts of the piston are also held together by the screw. Plate 61 thus constitutes an extending cam plate or cam extension secured to the piston. The piston is engaged in liquid-tight engagement about its periphery with the inner wall of the sleeve or cylinder 31.

The hollow boss 63 of the angle plate, which is normal to the piston, is provided near its lower end with a transverse cut-out 70 which affords clearance for the trip plate projection at the opposite side of the valve plate body, and similar clearance is provided at the upper end by withdrawal of the angle plate sufficiently toward the bottom of the cylinder to remove the boss from the path of horizontal reciprocation of the trip 51. As will appear more fully below, such projection intermediate these limiting conditions rides against first one side of the boss and then against the other side during the piston cycle of reciprocation and this, of course, restrains shifting of the valve plate 44 in the respectively opposite direction.

Figure 6:
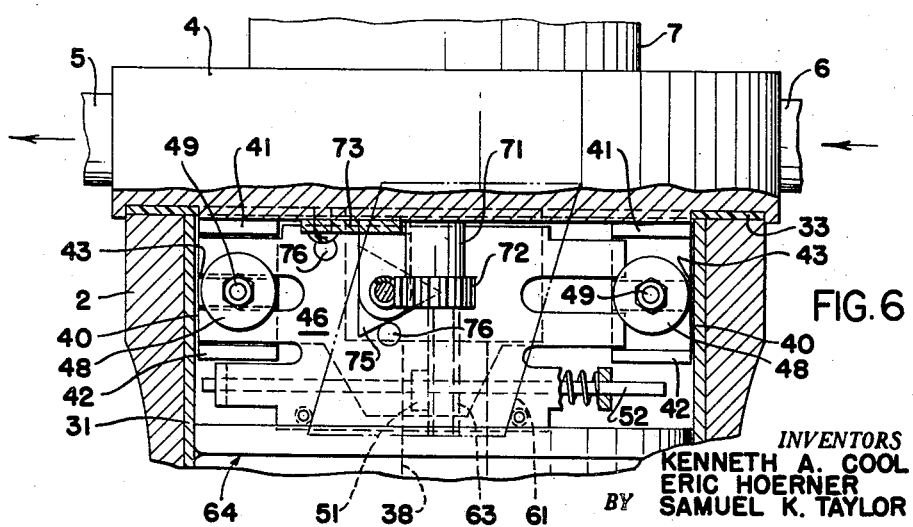
Fig. 6 is a view which corresponds to that of Fig. 3, but looking to the side of the inner mechanism opposite to the side illustrated in the latter.
Figure 7:
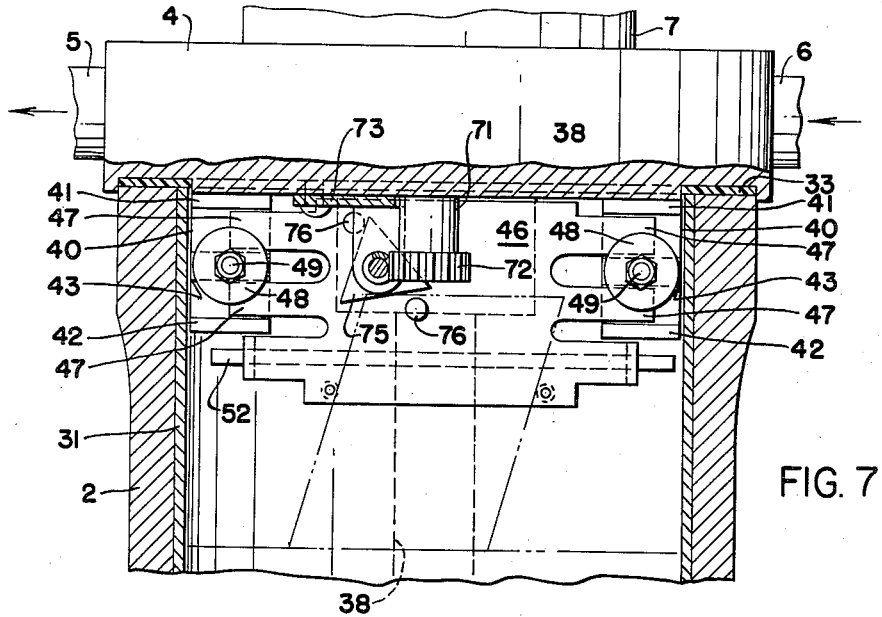
Fig. 7 is a view corresponding to Fig. 4 from the same viewpoint as Fig. 6.
Figure 8:
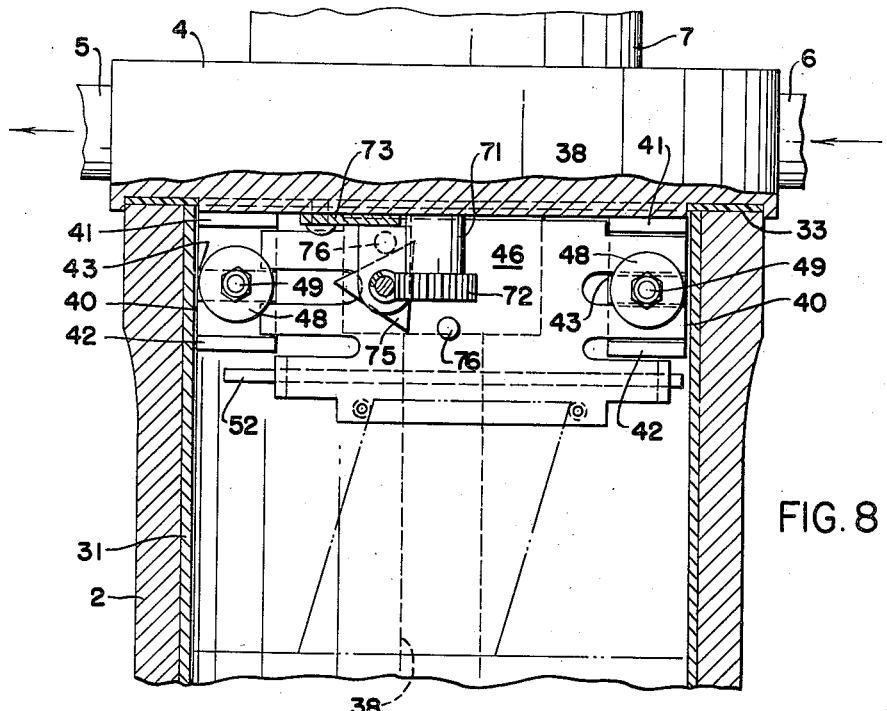
Fig. 8 is a view corresponding similarly to Fig. 5 without, however, showing the bottom of the casing or enclosure.

With reference now particularly to Figs. 6 to 8, the counter mechanism includes a shaft 71 on which a gear 72 is mounted. The gear is driven by an escapement device including a bracket 73 secured to the underside of the cover, a worm gear 74 supported by the bracket in mesh with the gear 72 and a triangular escapement plate 75 on the shaft of the worm gear. Such plate is disposed closely adjacent the rear side of the loader plate 46, and the latter is provided with projecting spaced apart pins 76 adapted to engage and rotate the escapement plate upon reciprocation of the loader plate. This drives the worm gear and in turn, the shaft of the counter, which is otherwise of known construction and is adapted to record reciprocations of the piston.

Figure 3:
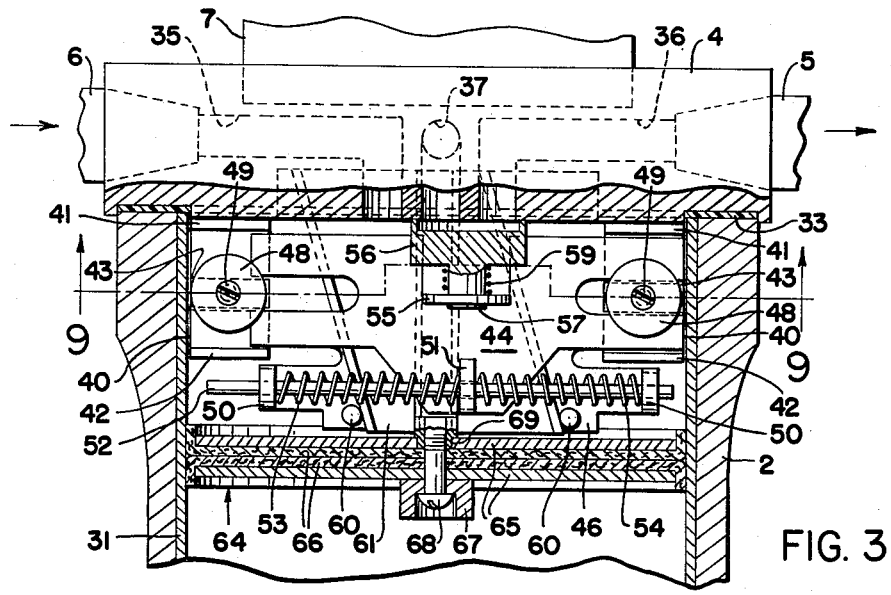
Fig. 3 is a fragmentary view of the upper portion of the meter with the enclosure thereof broken away to expose one side of the inner mechanism.
Figure 4:
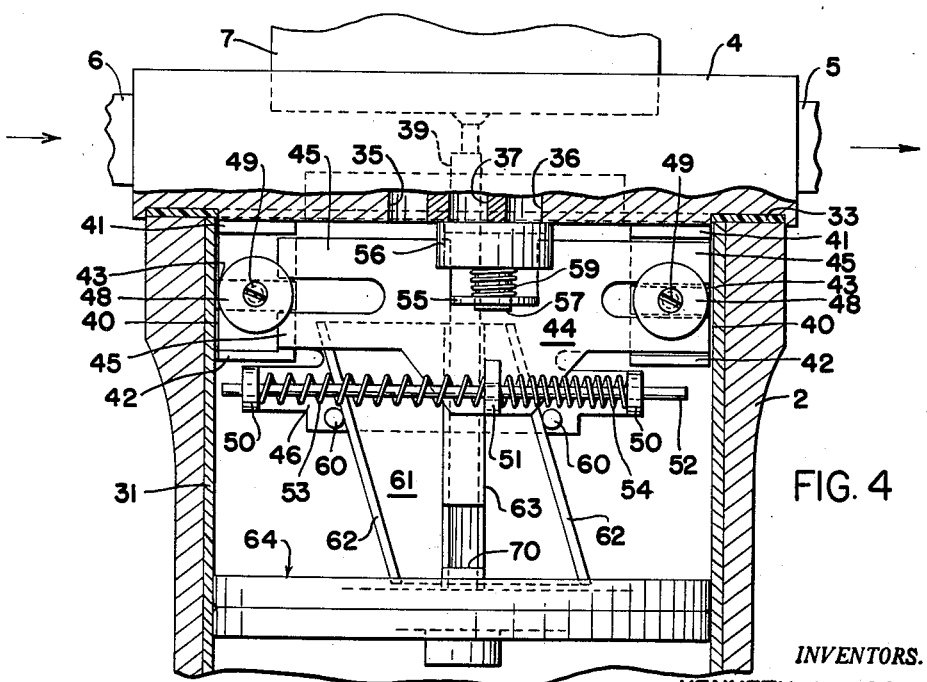
Fig. 4 is a view generally similar to that of Fig. 3, but illustrating the parts in a different stage of the operating cycle.

In the operation of the meter, commencing with that condition of the mechanism shown in Fig. 3, the piston 64 here is at its most elevated point and the valve 56 connects the intermediate port 37 with the outlet or exhaust port 36. The liquid thus flows through the inlet 6 and port 35 and enters the top of the cylinder. The piston is forced downwardly by virtue of the liquid pressure, Fig. 4 illustrating an intermediate position of the piston, and it will be seen that any liquid in the cylinder beneath the piston is expelled through the wall recess 38 externally of the cylinder 31 and thus from the bottom through the port 37, valve 56, and port 36 to the outlet 5 of the meter. The downward movement of the piston causes the loader plate 46 to be shifted to the left as viewed in such figures, due to the camming action of the angle plate, and this causes the spring 54 to be compressed, since the valve plate 44 is restrained from moving correspondingly by the engagement of its trip element 51 with the right-hand side of the angle plate boss 63.

Figure 5:
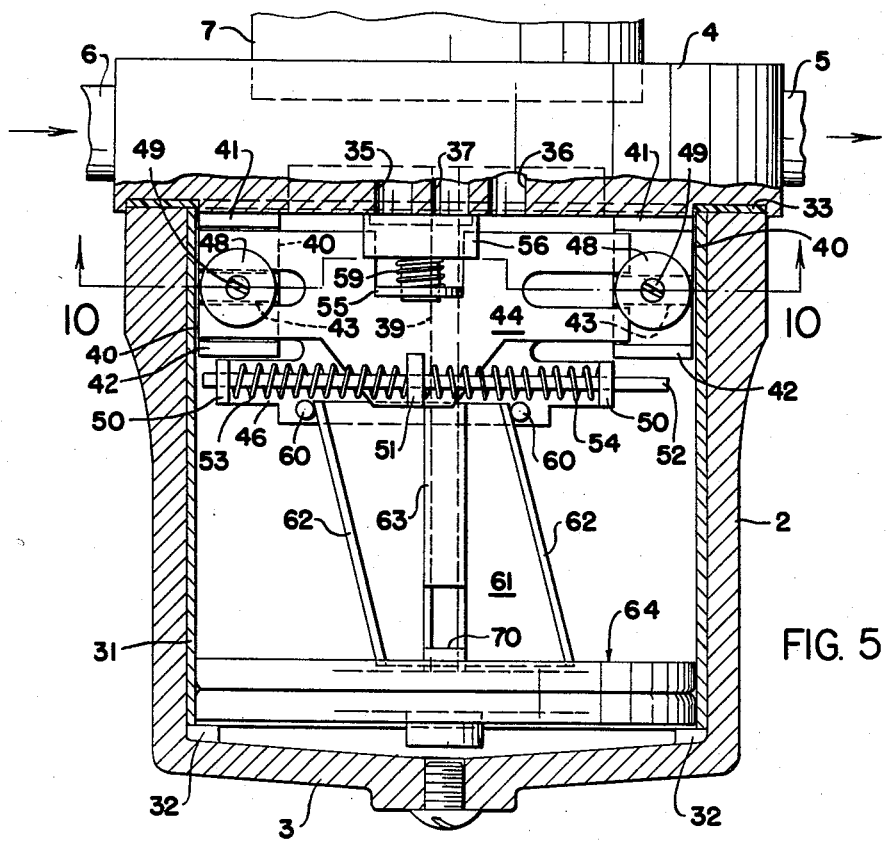
Fig. 5 is a complete side elevation with the near wall of the outer casing again broken away and the mechanism in a further operating stage.

Such downward travel of the piston continues, with progressive compression of the spring 54, until the angle plate boss is withdrawn sufficiently to free the trip element, the piston at this point being approximately at but spaced slightly above the bottom of the cylinder. The piston does not hit any end stops, its stroke being wholly within the end limits of the casing. In Fig. 5, the mechanism is depicted just following such release of the trip element, which has resulted in the valve plate and hence the valve 56 being very quickly actuated to the left by the energy of loaded spring 54. In such position, the valve now bridges the inlet port 35 and the port 37 leading to the bottom of the cylinder and opens the outlet port 36 at the top of the cylinder.

Further incoming fuel is hence caused to flow to the space beneath the piston, whereby the same is forced upwardly with the liquid thereabove being expelled through the outlet port 36. During such upward travel, the spring 53 is now compressed by the camming action of the angle plate, the trip plate 51 in this part of the cycle riding against the left-hand side of the boss 63 and restrained until the projection reaches the cut-out 70 of the same. When this occurs, the spring 53 acts instantaneously to shift the valve 56 to the first-described position, whereupon the flow is again reversed.

The cammed movement of the loader plate 46 also causes the triangular escapement plate 75 to be rotated in one direction by the engagement therewith of the loader plate pins 76. This will be apparent from Figs. 6 to 8, from which it will be appreciated that the escapement plate is turned in the same direction with each stroke of the piston, the pins successively striking the corners of the plate. The counter shaft is thus driven in one direction, such operation being effective to turn the digit wheels of the counter which are preferably visible through a glass window in the top of the counter assembly.

The above-described cycle is repeated continuously as long as fuel is supplied to the meter, and thus the record of actual fuel consumption is obtained. Accuracy of the measurement is realized by a number of features, including the air and vapor by-pass in the metering of liquids. In addition, the piston arrangement provides an invariable stroke and, since the piston itself determines the valve shifting, there is no problem of providing and maintaining synchronism between the piston reciprocation and the valve operation, for example, as would be presented by the employment of stops and the like for determining the piston stroke.

The compression springs of our new meter are obviously highly efficient and will remain so over relatively long periods of use. It will also be seen that the particular structure of the operating parts and their manner of interconnection is very durable, the valve, loader and angle plates being in the form of slides and positive and reliable camming actions being provided for operation of the same.

In this preferred embodiment of the invention, a recess formed in the head and casing outwardly of the inner sleeve or cylinder is provided for flow of the fluid between the top and bottom of the assembly. Actually, there might be a slight space between the sleeve and the casing, depending upon the tolerances maintained in manufacture of the parts, which would serve to conduct a portion of the fluid. This spacing could intentionally be increased more efficiently to supplement the separately formed passageway or, if adequately dimensioned, to be used in substitution of the latter.

Other modes of applying the principle of the invention may be employed, change being made as regards the details described, provided the features stated in any of the following claims, or the equivalent of such, be employed.

We therefore particularly point out and distinctly claim as our invention:

1. In a piston-type fluid meter, valve means for reversing the direction of fluid flow against the piston, a slide having longitudinally spaced-apart cam surfaces, a stem secured to the meter piston, a slanted cam plate attached to said stem and engaged at its sides with the slide cam surfaces, whereby reciprocation of the piston causes the slide to reciprocate, double-acting spring mechanism interconnecting the valve means and slide, and a trip member carried by the valve means in engagement with the piston stem, such engagement restraining the valve means in travel of the piston between predetermined points thereby to load the spring mechanism, the trip member being released at such points whereupon the spring energy is transmitted to the valve means for actuation thereof.

2. The combination set forth in claim 1 characterized further in that said piston stem is formed with laterally spaced stop surfaces extending a predetermined distance parallel to the path of piston reciprocation, such stop surfaces being alternately engaged by the trip member carried by the valve means.

3. A fluid meter comprising a piston-cylinder assembly, valve means for alternately directing fluid supplied to such assembly to the opposite sides of the piston, an actuator for said valve means, spring means between said actuator and the valve means through which movement of the former is transmitted to the latter, means for moving the actuator in response to reciprocation of the piston, a trip member carried by the valve means, and an elongated stop of predetermined length fixed to and extending from the piston, said stop upon reciprocation of the piston moving transversely across the path of movement of the trip member for engagement thereby to restrain the valve means from being moved by the actuator and to load the spring means, withdrawal of the stop from such holding engagement with the trip member releasing the valve means for quick actuation thereof.

4. A fluid meter comprising a piston-cylinder assembly, valve means for alternately directing fluid supplied to such assembly to the opposite sides of the piston, a reciprocable actuator for said valve means, spring means between said actuator and the valve means through which reciprocatory movement of the former is transmitted to the latter, means for moving the actuator in response to reciprocation of the piston, a trip member carried by the valve means, and an elongated stop fixed to and extending from the piston for engagement by said trip member, said stop reciprocating with the piston across the path of movement of the trip member and the latter being free to pass from one side to the other of the stop at the ends thereof, the valve means thereby being arrested while the piston moves between the limits defined by the ends of the stop to load the spring means for quick actuation of the same when the trip member is thus freed.

5. A fluid meter comprising a piston-cylinder assembly, valve means for alternately directing fluid supplied to such assembly to the opposite sides of the piston, a reciprocable actuator for said valve means, a trip member carried by the valve means, and an extension fixed to the piston having cam surfaces in spaced parallel relation at an angle to the cylinder axis and a stop portion extending parallel to such axis, such cam surfaces of said extension engaging the actuator to reciprocate the same as the piston reciprocates, and the stop portion thereof being engaged alternately at its opposite sides by the trip member to restrain the valve means and load the spring means, the ends of the stop portion thereby defining the limits of the piston reciprocation at which the valve means is released and quickly shifted to reverse the piston travel.

References Cited in the file of this patent

UNITED STATES PATENTS

| | | |
|---|---|---|
| 69,007 | Mason | Sept. 17, 1867 |
| 455,244 | Ahrbecker | June 30, 1891 |
| 643,847 | McKaig | Feb. 20, 1909 |
| 1,534,238 | Mercer | Apr. 23, 1925 |
| 1,870,897 | Davis | Aug. 9, 1932 |
| 1,905,549 | Bassler | Apr. 25, 1933 |
| 2,327,520 | Brubaker | Apr. 8, 1941 |
| 2,540,939 | Foster | Feb. 6, 1951 |
| 2,697,943 | Pressler | Dec. 28, 1954 |